US012074394B2

(12) United States Patent
Wittmann

(10) Patent No.: US 12,074,394 B2
(45) Date of Patent: Aug. 27, 2024

(54) PLUG CONNECTOR

(71) Applicant: Robert Bosch GmbH, Stuttgart (DE)

(72) Inventor: Rolf Wittmann, Ubstadt-Weiher (DE)

(73) Assignee: ROBERT BOSCH GMBH, Stuttgart (DE)

( * ) Notice: Subject to any disclaimer, the term of this patent is extended or adjusted under 35 U.S.C. 154(b) by 434 days.

(21) Appl. No.: 17/621,012

(22) PCT Filed: Jun. 18, 2020

(86) PCT No.: PCT/EP2020/066883
§ 371 (c)(1),
(2) Date: Feb. 15, 2022

(87) PCT Pub. No.: WO2020/260117
PCT Pub. Date: Dec. 30, 2020

(65) Prior Publication Data

US 2022/0368065 A1 Nov. 17, 2022

(30) Foreign Application Priority Data

Jun. 26, 2019 (DE) ..................... 10 2019 209 235.7

(51) Int. Cl.
*H01R 13/00* (2006.01)
*H01R 13/52* (2006.01)
*H01R 13/641* (2006.01)

(52) U.S. Cl.
CPC ....... *H01R 13/5202* (2013.01); *H01R 13/641* (2013.01)

(58) Field of Classification Search
CPC .......................... H01R 13/5202; H01R 13/641
See application file for complete search history.

(56) References Cited

U.S. PATENT DOCUMENTS 5,308,261 A * 5/1994 Kightlinger ........ H01R 13/6272 439/352
5,496,184 A * 3/1996 Garrett ................. H01R 13/436 439/701

(Continued)

FOREIGN PATENT DOCUMENTS

DE 69420098 T2 3/2000
DE 29904381 U1 8/2000

(Continued)

OTHER PUBLICATIONS

International Search Report for PCT/EP2020/066883 Issued Sep. 3, 2020.

*Primary Examiner* — Phuong Chi Thi Nguyen
(74) *Attorney, Agent, or Firm* — NORTON ROSE FULBRIGHT US LLP; Gerard A. Messina

(57) ABSTRACT

A plug connector for connecting to a mating plug connector along an insertion direction. The plug connector includes a housing including an interior and a contact element situated in the interior. The plug connector further includes a connector position assurance. The housing includes a pressure equalization element for equalizing the pressure of the interior with respect to the exterior of the housing. The CPA is situated at the housing and is movable between a first position and a second position relative to the housing, a sealing element being provided at CPA, the pressure equalization element being sealed with respect to the exterior by the sealing element in the second position.

10 Claims, 4 Drawing Sheets

(56) References Cited

U.S. PATENT DOCUMENTS

| | | | | |
|---|---|---|---|---|
| 6,113,407 | A | 9/2000 | Martin | |
| 6,361,356 | B1 * | 3/2002 | Heberlein | H01R 13/62977 439/157 |
| 6,939,159 | B1 * | 9/2005 | Klein | H01R 13/6272 439/378 |
| 2009/0098771 | A1 | 4/2009 | Kim | |
| 2013/0029508 | A1 | 1/2013 | Forell et al. | |
| 2014/0073192 | A1 * | 3/2014 | Wittmann | H01R 13/6485 439/660 |
| 2014/0099841 | A1 * | 4/2014 | Schmatz | H01R 13/432 439/872 |
| 2016/0372854 | A1 * | 12/2016 | Schmatz | H01R 13/428 |

FOREIGN PATENT DOCUMENTS

| | | | |
|---|---|---|---|
| DE | 20013285 | U1 | 12/2001 |
| DE | 102014206431 | A1 | 10/2015 |
| EP | 1811612 | A1 | 7/2007 |
| JP | H10172647 | A | 6/1998 |
| JP | H1167350 | A | 3/1999 |
| JP | H11144800 | A | 5/1999 |
| JP | H11308734 | A | 11/1999 |
| JP | 2009093906 | A | 4/2009 |

* cited by examiner

PLUG CONNECTOR

FIELD

The present invention relates to a plug connector.

BACKGROUND INFORMATION

It is understood in the related art that it may be advantageous for the function of an electrical plug connection made up of a plug connector and a mating plug connector that the plug connection is situated in a defined plug position after the insertion process or connection process. This defined plug position or connection position may, for example, be an end position. In the defined plug position, the plug connection may, for example, be locked in a final locking position.

In order to indicate the presence of the defined plug position to an operator or an installer, additional actuation elements, so-called connector position assurances (CPAs) or also control sliders are frequently used. These are easily recognizable for the operator and may be moved or shifted into an end position only if the plug connection is in the defined plug position.

One specific embodiment of a CPA is described, for example, in German Patent Application No. DE 299 04 381 U1, in which the CPA is referred to as a control slider.

A CPA and a plug connector arrangement that includes a CPA are described in German Patent Application No. DE 10 2014 206 431 A1.

SUMMARY

According to the present invention, the defined plug position of a plug connection should be safely identified by an operator or installer and an interior of a plug connector arrangement made up of a plug connector or plug and mating plug connector or mating plug should be designed to be media-tight in the connected state with respect to the exterior. Thus, on the one hand a secure electrical connection should be achieved and, on the other hand, the durability of the electrical connection in the interior should be ensured. The durability in this case may be achieved by preventing or at least drastically inhibiting the entry of fluid media (for example, liquids or gases) as well as of filth, particles, and dirt. When connecting the plug and the mating plug, however, the (shared) interior volume enclosed by plug and mating plug is reduced. Once the sealing effect sets in during connection starting from a sealed position, the air in the interior volume is unable to readily escape during further connection, as a result of which the plug resistance or the mating force is notably increased.

The provision of a sealing effect not occurring until very late (for example, shortly before the defined plug position) may be prevented by technical requirements and/or customer requirements.

There may therefore be a need to provide a plug connector, in which the attainment of the defined plug position may be simply and reliably recognized, for example, even under limited visibility conditions, and the interior thereof is sealed in the state with the connected mating plug connector with respect to the exterior or to the exterior surroundings of the plug connector. At the same time, the mating force of the plug connector when connected with the mating plug connector is to be preferably minimal. An increase in the mating force during the connection as a result of a tightly enclosed air volume in the interior is to be preferably avoided. Similarly, when disconnecting the plug connector from the mating plug connector, the necessary force should preferably not be increased by working against an underpressure resulting from the increase in the tightly sealed interior volume.

This need may be met by example embodiments of the present invention. Advantageous specific embodiments of the present invention are disclosed herein.

According to one aspect of the present invention, a plug connector is provided for connecting to a mating plug connector along an insertion direction. In accordance with an example embodiment of the present invention, the plug connector includes a housing that includes an interior and a contact element situated in the interior. The plug connector further includes a connector position assurance (CPA). The housing includes a pressure equalization element for equalizing the pressure of the interior with respect to an exterior of the housing. The CPA is situated at or attached to the housing and is movable between a first position and a second position relative to the housing. A sealing element or a sealing means (i.e., a seal) is provided at the CPA, the pressure equalization element being sealed in the second position by the sealing element with respect to the exterior.

In other words: in the case of the plug connector, it is provided to connect the CPA to a sealing element. In this way, the pressure equalization element is also sealed for the interior, aided by the displacement of the CPA into its end position (second position), which indicates the correct plug position. The sealing element requires no valve function for this purpose. When disconnecting or opening the plug connection, the CPA must initially be shifted back out of the second position (for example, into the initial position), as a result of which the seal of the pressure equalization element may be released again.

The CPA may be attached at the housing in a loss-preventing and moveable manner. It may, for example, be guided in a slotted guide.

This advantageously ensures that with the aid of the CPA, it is possible to simply, safely and reliably recognize the correct connection of the plug connector and the mating plug connector. At the same time, the mating force or opening force is not increased by an air volume trapped or enclosed in the interior, since the air volume is able to communicate or be exchanged with the exterior or exterior surroundings of the plug connector with the aid of the pressure equalization element. As a result, advantageously no overpressure forms in the interior during the connection, which increases the mating force. Similarly, the formation of an underpressure in the interior when opening the plug connection, which would increase the opening force, is advantageously counteracted. Finally, it is advantageously ensured that the plug connector enables the provision of a tight plug connection. During the process of connecting with the mating plug connector, a pressure equalization and thus the exchange of fluid flows is enabled; at the same time, however, it is ensured that after completion of the connection process and the actuation of the CPA, a seal of the interior with respect to the exterior is effectuated.

In this way, the CPA advantageously fulfills a multifunction:

- it enables the verification of the correct inserted position or plug position;
- it further effectuates in the connected state together with the sealing means the (media-)tight seal of the interior from the exterior by sealing the pressure equalization element;
- finally, it ensures in cooperation with the pressure equalization element during the insertion process or during the opening process that the forces required therefore are not unnecessarily increased—because the CPA is not located in the second position during the insertion or opening processes but, for example, in the first position, and does not seal the pressure equalization element with the aid of the sealing means.

In accordance with an example embodiment of the present invention, it is understood that exactly one contact element may be situated, for example, inserted in the interior, and that also multiple contact elements may also be situated in the interior, for example, two or also more than two contact elements.

In accordance with an example embodiment of the present invention, a contact chamber may also be situated in the interior of the plug connector, which is configured to accommodate the contact element. It is understood that multiple contact chambers may also be situated in the interior. Multiple contact elements may be situated in one contact chamber. Exactly one single contact element may also be situated in each contact chamber.

The contact element may be latched in the contact chamber, for example. For this purpose, a (elastically reversibly deflectable) latching lance may be provided at, and an undercut may be provided in, the contact chamber. The provision of a latching lance at a wall of the contact chamber, which then engages in an undercut of the contact element, may also be possible.

The contact element may, for example, include one or multiple contact lamellas, which ensure a secure electrical contacting with an inserted and adjacently situated mating contact element.

In accordance with an example embodiment of the present invention, the contact element (or the contact elements) may be configured to contact a mating contact element of the mating plug connector. The contact element may, for example, be designed as a punched-bent part made from a metal sheet and may include a contact box, into which the mating contact element may be inserted. The contact element may be electrically connected to a line or to a cable.

The mating contact element may, for example, be designed as a pin, as a contact blade or the like.

It is understood that the mating contact element may also be designed in the form of a female contact and the contact element in the form of a male contact.

In accordance with an example embodiment of the present invention, in the second position, the CPA together with the sealing means seals the pressure equalization element with respect to exterior surroundings of the housing.

In accordance with an example embodiment of the present invention, it is further understood that further sealing elements for sealing the plug connector may be provided on the plug connector or on the mating plug connector. These further sealing elements may be situated, for example, in the area of cable passages through the housing. A radial seal may also be provided, which is situated between the housing walls of the plug connector and the mating plug connector in the connected state. Alternatively, a seal may also be effectuated by an external sealing element.

In the context of the present application, a radial direction is understood to mean a direction perpendicular to the insertion direction and a circumferential direction is understood to mean a direction that extends circumferentially around the insertion direction, unless specified otherwise in the text.

Because the CPA is configured in such a way that it is movable into the second position only when the plug connector and the mating plug connector are connected in a defined plug position, it is advantageously ensured that an installer or an operator may always safely recognize that the plug connection made up of plug connector and mating plug connector is correctly connected. The correct connection, i.e., for example, an end position, a final locking position, etc. (thus, i.e., the defined plug position) may be safely recognized even under poor visibility conditions or under cramped installation conditions, since the CPA may only be moved when the defined plug position is reached. The CPA may, for example, initially be located in the first position before the plug connector is connected to the mating plug connector.

A mechanical barrier may be provided, which prevents a movement of the CPA into the second position as long as the defined plug position is not yet reached. The movement may be achieved, for example, by shifting or rotating the CPA relative to the plug connector, for example, along a guide structure, for example, a slotted guide. After reaching the defined plug position, for example, a mechanical barrier for the CPA may be surmountable, so that the CPA is then moveable into the second position.

Because the pressure equalization element is formed by an opening in the housing, a particularly simple and cost-efficiently manufacturable pressure equalization element and plug connector housing may be provided.

It is understood that exactly one opening may be present. Multiple openings may, however, also be present, which are situated close together, for example. In the case of multiple openings, which then form the pressure equalization element, all openings are sealed in the second position of the CPA by the sealing element or sealing means of the CPA with respect to the exterior.

The opening or through-opening may, for example, be an opening in a wall of the housing. This opening connects, for example, the interior of the housing with the exterior, so that air located in the interior is able to communicate or to be exchanged with air from the exterior. The opening may preferably be an opening, which is not the opening for inserting the mating plug connector. The opening is located, for example, in the sealed portion of the interior, i.e., beyond a radial seal present by way of example.

Because the opening is covered by a diaphragm, the diaphragm being configured to be waterproof, but gas-permeable, it is advantageously ensured that the risk of the entry of liquids or also of filth, dirt or dust into the interior is minimized as long as the CPA is not yet moved into the second position. As a result, the interior is protected, for example, when transporting the plug connector or when handling the plug connector. Moreover, when opening the plug connection, this advantageously prevents filth, dirt, particles or also liquid from being able to enter from the exterior into the interior through the opening after moving the CPA from the second position into the first position. This is relevant, for example, in the automotive sector if the plug connection is opened in the engine compartment, since the surroundings of the plug connection and also the plug connection itself in the engine compartment may become contaminated over time and may also be exposed to moisture.

One refinement of the present invention provides that the sealing element is designed as a stopper, the sealing element being introduced into the opening in the second position of the CPA. This advantageously ensures that the opening may be sealed in a simple, safe, and permanently reliable manner. A sealing element designed in this way is advantageously particularly robust also with respect to challenging operating conditions such as, for example, high temperature fluctuations, vibrations, etc. The stopper in this case may, for example, be introduced into the opening as a cork is into a bottle.

Alternatively or in addition, it may be provided that in the second position of the CPA, the sealing element (preferably elastically designed) is pressed fully onto the opening. In this case the sealing element is pressed, for example, in particular, onto the edge of the opening or onto surroundings of the edge and it simultaneously fully covers the opening. The sealing element advantageously includes a flat or planar surface in the area of the contact with the edge in order to avoid leaks. A particularly simple sealing is advantageously enabled as a result. The edge of the opening is further advantageously protected as a result from contamination. Finally, such a sealing element may be manufactured in a particularly cost-efficient manner, since the seal is ensured regardless of the size tolerance of the sealing means, as long as the edge of the opening is securely covered. In the case of a suddenly occurring overpressure in the interior, a sealing means designed in such a way may advantageously also act in the manner of a relief valve.

Alternatively or in addition, it may be provided that the sealing element is designed in the manner of a sleeve, the sealing element being pulled over the opening in the second positon of the CPA. In other words: the sealing element is pulled over the edge of the opening and fully covers the opening as, for example, a crown cap covers the spout opening of a bottle, the sealing function being able to be ensured here, for example, also additionally by the inner wall of the sleeve abutting the outer wall of the opening. This provides a particularly simple sealing means, which ensures a secure seal even with tolerances in the distance between the sealing means and the opening. As a result of the sleeve wall, the wall may also be referred to as a collar, it is possible to ensure a seal even in the case of a distance tolerance corresponding to the height of the collar.

Alternatively or in addition, the sealing element may be designed as an O-ring, the sealing element abutting the housing in the second position of the CPA and the edge of the opening being completely surrounded. This provides a particularly simple and cost-efficient sealing means. O-rings are available in a large selection of materials, cord thicknesses and diameters, so that even with changes in the opening size or in the diameter of the opening for various plug connectors, an appropriately fitting O-ring may be easily and cost-efficiently selected, and in this way the seal is always ensured. A fitting O-ring may easily also be cost-efficiently selected and used for various materials of the housing or for different operating conditions.

It is understood that not just one single sealing means may be situated at the CPA. It is also possible to provide two or more sealing means. This may be the case, for example, when multiple openings form the pressure equalization element. It may, however, also be provided to configure the seal to be particularly secure by a staggering of multiple seals. Thus —purely as an example—the sealing element may be a stopper, which is surrounded by an O-ring. All other two-fold or even 3-fold combinations of sealing means are, of course, also possible, for example, the sealing means as a stopper, surrounded by a sleeve, this in turn surrounded by an O-ring.

It is understood that the sealing means may be manufactured, for example, from an elastic material. It may include, for example, rubber, silicone, etc.

In one refinement of the present invention, it is provided that a tubular connecting piece is provided at the opening, a further opening being provided at a communication end of the connecting piece facing away from the opening, the CPA including a first end, which faces the communication end of the connecting piece at least in the second position, the sealing element being situated at the first end of the CPA. This advantageously ensures that the risk of the opening in the state not closed by the CPA or by the sealing means being undesirably covered or closed and of the pressure equalization between the interior and the exterior being prevented in an undesirable manner is reduced. In addition, the distance between the exterior and the interior is advantageously extended so that potentially penetrating dirt or penetrating moisture is initially able to settle at the interior wall of the connecting piece and does not even reach the interior. Finally, the direction of the air outlet or air inlet with respect to the opening may be advantageously changed or rotated, so that a simpler seal becomes possible as a result of the CPA and of its predefined movement direction.

The tubular connecting piece may, for example, represent a type of channel through which the air from the interior is able to communicate with the exterior. The connecting piece in this case may also have a curvature, so that the further opening points in a different direction from the opening in the housing. This may further advantageously reduce the penetration of dirt or moisture into the interior. The connecting piece may, however, also be designed to be straight, so that the further opening points in the same direction as the opening in the housing.

Thus, it may be advantageously ensured by the connecting piece that, for example, a distance to the sealing means situated at the CPA is reduced. It may also be ensured that the further opening is oriented in such a way that during the movement of the CPA into the second position, the sealing means is able to securely seal the interior from the exterior. Depending on the design of the plug connector, i.e., on the arrangement of the CPA at the housing, on the movement direction of the CPA and on the position of the opening in the housing, the connecting piece may facilitate or even make possible the function of the sealing concept without having to carry out extensive redesigning at the plug connector. In this way, the concept may be advantageously implemented with little effort, even in existing plug connectors.

The sealing element, because it is situated at a first front end of the CPA, advantageously enables a particularly simple manufacturing of the CPA. In this way, a potentially defective sealing element may also be advantageously particularly simply exchanged. The first front end may, for example, point in the direction that is defined by the movement of the CPA from the first position into the second position. This advantageously ensures that the sealing means in the second position is inserted or pressed into the opening or into the further opening (for example, as a stopper) and/or is pressed onto the edge of the opening or of the further opening and covers the opening or the further opening (in the area of the opening edge, for example, as a planar or flat sealing element) and/or is pulled over the edge of the opening or of the further opening (for example, as a sleeve).

It may be provided that the sealing element is designed as a stopper, the sealing element being introduced into the further opening of the connecting piece in the second position of the CPA. This advantageously ensures a particularly secure, reliable and robust seal. The advantages described above for the design as a stopper apply here analogously.

Alternatively or in addition, it may be provided that in the second position of the CPA, the sealing element is pressed fully onto the further opening of the connecting piece. This ensures a cost-efficient manufacture of the sealing element, since greater tolerances are possible, for example, in the diameter of the further opening or in the surface of the sealing element. The sealing element preferably has a flat or planar surface in the area of the contact with the edge in order to avoid leaks. The advantages for the full pressing-on apply here analogously, in particular, also the possible function as a relief valve.

Alternatively or in addition, the sealing element may be designed in the manner of a sleeve, the sealing element being pulled over the communication end in the second position of the CPA. As a result, a particular simple sealing means is provided, which also ensures a secure seal even with tolerances in the distance between the sealing means and the further opening. Due to the wall of the sleeve, the wall may also be referred to as a collar, a seal may be ensured even in the case of a distance tolerance corresponding to the height of the collar. In the case of the connecting piece, a sealing means or sealing element designed in the manner of a sleeve may, for example, also be designed as an O-ring, which surrounds and seals the edge of the connecting piece in the area of the further opening in the second position of the CPA.

The advantages of the design as a sleeve and the design as an O-ring described above apply here analogously.

According to one second aspect of the present invention, a plug connector arrangement is provided. The plug connector arrangement includes a plug connector as described above. The plug connector arrangement further includes a mating plug connector including a mating plug connector housing, a mating contact element for contacting the contact element being provided in the mating plug connector housing.

A plug connection is formed in the connected state of the plug connector and the mating plug connector.

In the plug connector arrangement, it may be advantageously safely and reliable established with the aid of the CPA whether the defined plug position (for example, a final position, an end locking position, an end position, etc.) has been reached. A minimal mating force during the connection and a minimal opening force during an unplugging or during a loosening or during an opening of the plug connection are further ensured by the pressure equalization element. Finally, it is advantageously ensured that in the connected state, when the CPA is moved into the second position, no fluid media, in particular, no liquid, and also no dirt or filth are able to enter from the exterior through the pressure equalization element into the interior of the plug connector or of the plug connection or into the shared interior made up of plug connector and mating plug connector.

A secure and reliable electrical connection between the contact element and the mating contact element is advantageously created over the service life as a result of the interior of the housing being sealed with respect to the exterior of the housing in a state in which the plug connector and the mating plug connector are connected in the defined plug position and in which the CPA is moved into the second position. The risk of corrosion of the contact element and/or of the mating contact element is reduced as is the risk of short circuits, for example, as a result of moisture in the interior, if more than one contact element-mating contact element pair is provided in the plug connector arrangement.

BRIEF DESCRIPTION OF THE DRAWINGS

Further features and advantages of the present invention will become apparent to those skilled in the art from the following description of exemplary specific embodiments, which are not to be interpreted as restricting the present invention, with reference to the figures.

DETAILED DESCRIPTION OF EXAMPLE EMBODIMENTS

Figure 1A:
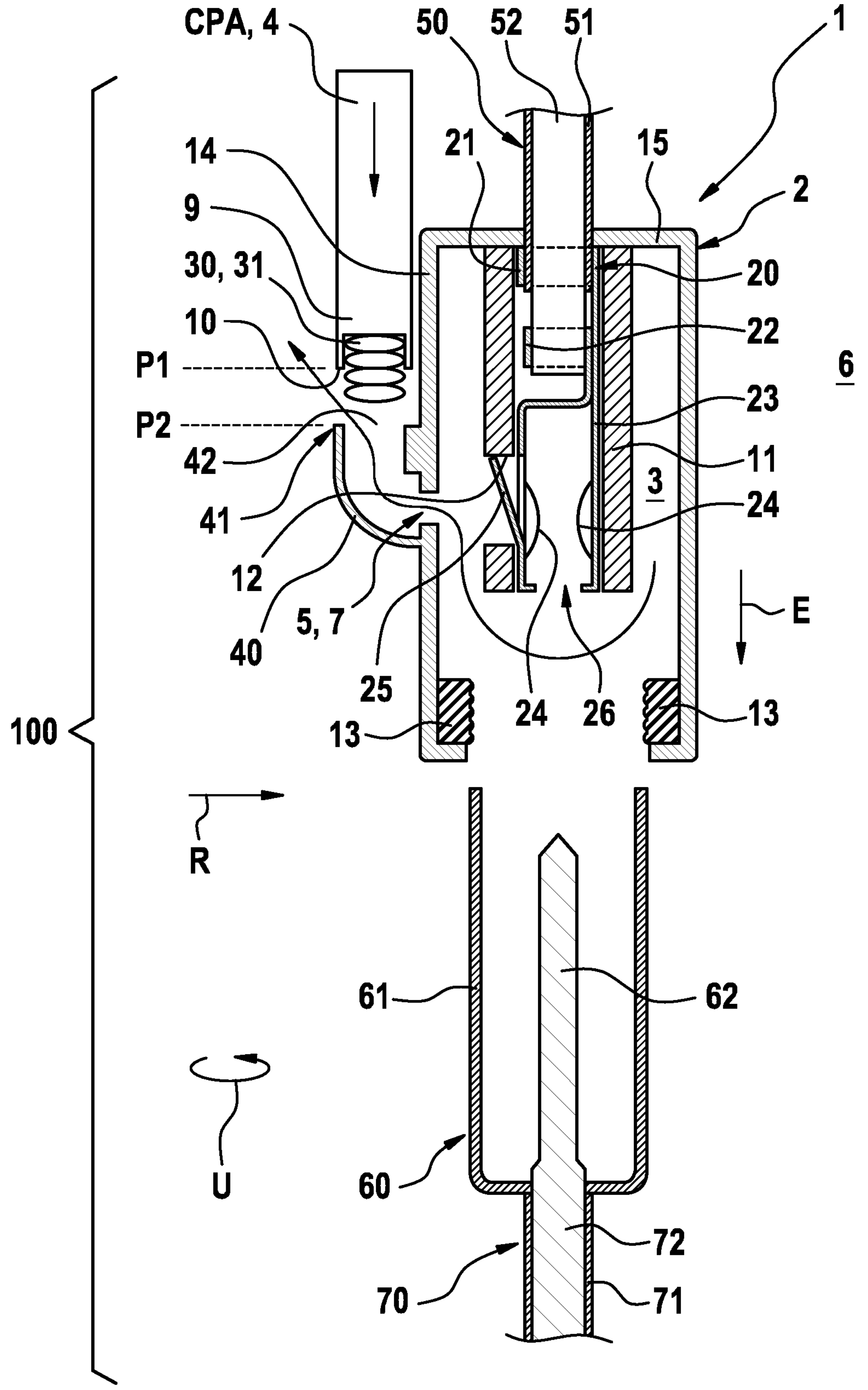
FIG. 1A schematically shows a cross section of a plug connector and of a mating plug connector (plug connector arrangement) in a non-connected plug position with a CPA in a first position, in accordance with an example embodiment of the present invention.

FIG. 1A schematically shows a cross section of a plug connector arrangement 100, which includes a plug connector 1 and a mating plug connector 60.

Plug connector 1 is configured for connecting to mating plug connector 60 along an insertion direction E. Plug connector 1 includes a housing 2 including an interior 3 and a contact element 20 situated in interior 3, multiple contact elements 20 may also be provided, of which only one may be seen in the cross section represented. Plug connector 1 includes a connector position assurance (CPA, 4). Housing 2 includes a pressure equalization element 5 for equalizing the pressure of interior 3 with respect to an exterior 6 of housing 2. CPA 4 is situated at housing 2 and movable between a first position P1 and a second position P2 relative to housing 2. A sealing element 30 is provided at CPA 4, for example, indirectly or directly in a loss-preventing manner fastened or attached. In order to enable a connection of plug connector 1 and mating plug connector 60 without increased mating force, in order to further recognize that a defined plug position is reached, and in order at the same time to prevent a penetration of moisture, dirt or filth into interior 3 in the connected state, it is provided that in second position P2, pressure equalization element 5 is sealed by sealing element 30 with respect to exterior 6 (see in this regard also FIG. 1C).

Radial direction R extends perpendicularly to insertion direction E and circumferential direction U encircles insertion direction E.

Plug connector 1 is connected to or includes a first cable 50. First cable 50 includes a first conductor 52 and a first insulation 51 as viewed from the inside outwardly, which surrounds first conductor 52. In principle, a shield conductor may also be provided, as well as an outer insulation, which then surrounds the shield conductor. First cable 50 may also include multiple first conductors 52. For example, each contact element 20 may be connected in each case to one first conductor 52. The electrical connection of multiple contact elements 20 to a first conductor 52 is also possible. First conductor 52 may, for example, be designed for transferring signals. It may, however, also be designed for transferring high currents (for example, more than 10 A or even more than 50 A) and/or for applying high voltages (for example, more than 40 V or even more than 100 V or even more than 400V). For transferring high currents, first conductor 52 may, for example, have a cross section of more than 1 $mm^2$ or more than 4 $mm^2$.

Mating plug connector 60 includes a mating plug connector housing 61, a mating contact element 62 for contacting contact element 20 being provided in mating plug connector housing 61. Mating contact element 62 may, for example, be designed as a pin or a contact blade (male contact). In principle, mating contact element 62 may, for example, also be designed as a female contact, or it may be provided that contact element 20 and mating contact element 62 are designed in the manner of tabs, which are pressed against one another in the contacted state. It is also possible that multiple mating contact elements 62 are provided in or at mating plug connector 60.

Mating plug connector 60 is connected to or includes a second cable 70. Second cable 70 includes a second conductor 72 and a second insulation 71, as viewed from the inside outwardly, which surrounds second conductor 72. In principle, a shield conductor may also be provided, as well as an outer insulation, which then surrounds the shield conductor. Second cable 70 may also include multiple second conductors 72. For example, each mating contact element 62 may be connected in each case to one second conductor 52. The electrical connection of multiple mating contact elements 62 to a second conductor 72 is also possible. Second connector 72 may, for example, be designed for transferring signals. It may, however, also be designed for transferring high currents (for example, more than 10 A or even more than 50 A) and/or for applying high voltages (for example, more than 40 V or even more than 100 V or even more than 400 V). For transferring high currents, second conductor 72 may, for example, have a cross section of more than 1 $mm^2$ or more than 4 $mm^2$.

A contact chamber 1 for accommodating a contact element 20 is situated in interior 3 of plug connector 1. Multiple contact chambers 11 may also be situated in interior 3. Exactly one contact element 20 may be located in each contact chamber 11, however, multiple contact elements 20 may also be installed, for example, inserted into, each contact chamber 11. Only one contact chamber 11 is apparent in the cross section of FIG. 1A.

Figure 1C:
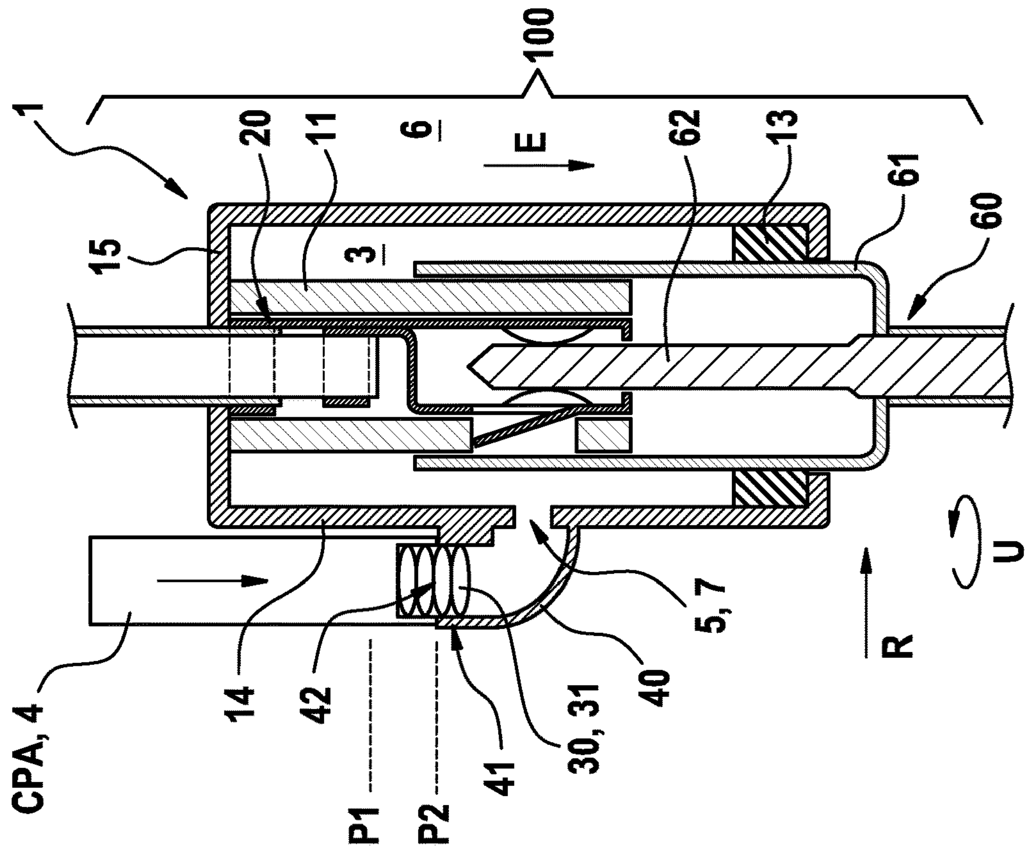
FIG. 1C shows the plug connection from FIG. 1B, in which the CPA is moved into a second position, in accordance with an example embodiment of the present invention.

Contact element 20 includes a contact box 23, into which mating contact element 62 of mating plug connector 60 may be inserted through an insertion opening 26 situated on the front side, i.e., facing mating plug connector 60. A contact lamella 24, for example, may be situated in the interior of contact box 23 (here two contact lamellas 24 are visible), which establish or secure or improve the electrical contact to mating contact element 62 in the contacted state (FIG. 1C). A cable crimp 22 for fastening first conductor 52 and an insulation crimp 21 for fastening first insulation 51 are provided here—merely by way of example—at the rear end of contact element 20. Contact box 23 further includes a, for example, elastically reversibly movable latching lance 25, by which contact element 20 may be latched in contact chamber 23 at an undercut 12 of contact chamber 11.

In the exemplary embodiment represented, a radial seal 13 is provided or situated or attached at the front end of housing 2. This seal seals interior 3 in the connected state with mating plug connector 60 with respect to exterior 6 and in this way prevents the penetration of moisture, liquids, dirt and filth into interior 3.

CPA 4 in this case is configured in such a way that it is movable into second position P2 only when plug connector 1 and mating plug connecter 60 are connected in a defined plug position. If this defined plug position is not reached, it may, for example, be provided that a displacement or rotation of CPA 4 from first position P1 into second position P2 is mechanically blocked. At the same time, it may be provided that a loosening of the plug connection, i.e., an unplugging of plug connector 1 and mating plug connector 60 is possible only when CPA 4 is moved previously in such a way that it is no longer located in second position P2. This may, for example, be achieved by displacing or rotating CPA 4 in the direction of first position P1 or even all the way into first position P1. As a result of this movement, the seal of pressure equalization 5 with respect to exterior 6 is also broken.

In the exemplary embodiment represented, pressure equalization element 5 is formed by an opening 7 in housing 2, other types of pressure equalization elements 5 also being conceivable, for example, multipart housings 2, the housing parts, for example, being displaceable against one another. This opening 7 in the exemplary embodiment is located in a side wall 14 of the housing. It is, however, also possible that opening 7 is located at a base 15 of housing 2, close to first cable 50. Opening 7 may, for example, with respect to radial seal 13, provided by way of example in this exemplary embodiment, be situated behind the radial seal, i.e., further in interior 3.

Figure 1B:
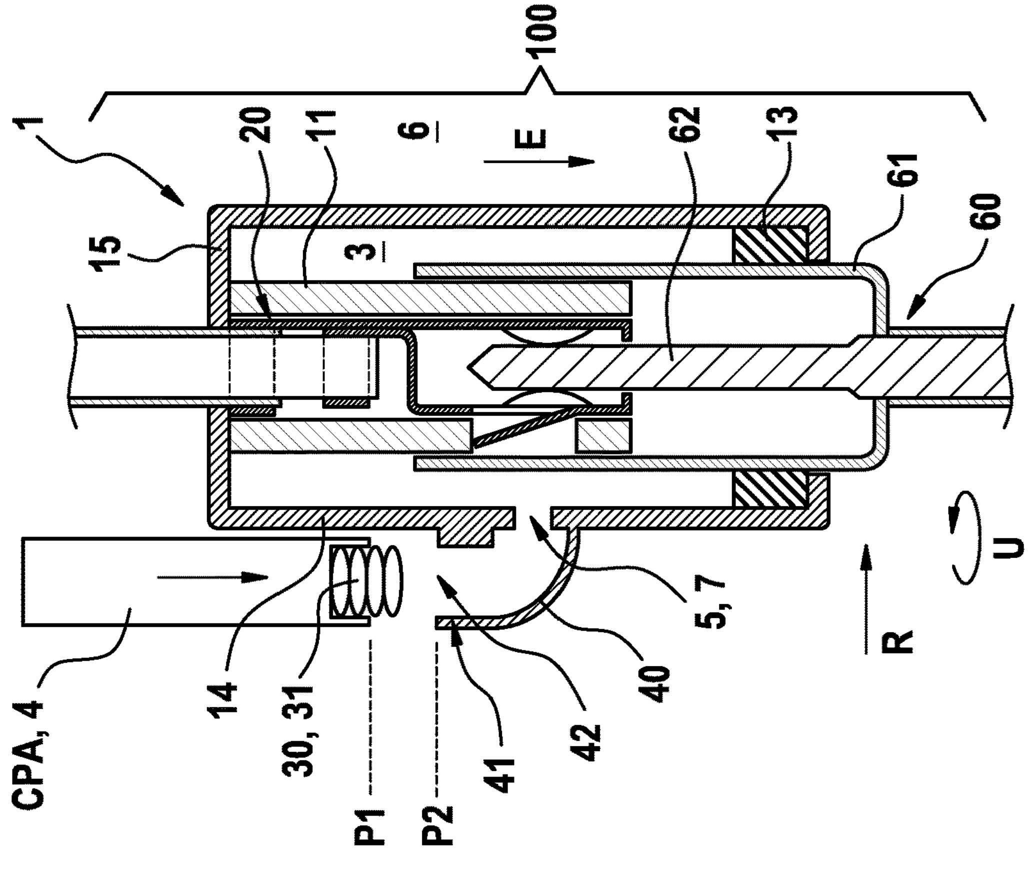
FIG. 1B shows the plug connector arrangement from FIG. 1A after establishing the plug connection in the defined plug position, in which the CPA is still located in the first position, in accordance with an example embodiment of the present invention.

In the exemplary embodiments of FIGS. 1A through 1C, a tubular connecting piece 40 is provided at opening 7, a further opening 42 being provided at a communication end 41 of connecting piece 40 facing away from opening 7. Connecting piece 40 here has a curved shape, so that further opening 42 points in a direction opposite insertion direction E, whereas opening 7 points in radial direction R from interior 3 to exterior 6. Connecting piece 40 thus rotates the direction by 90°. In this way, moisture or dirt penetrating into further opening 42 is able to first settle t the interior wall of connecting piece 40. This reduces the risk of dirt or moisture entering into interior 3. CPA 4 includes here a first end 9, which faces communication end 41 of connecting piece 40 at least in second position P2. Sealing element 30 is situated here at first end 9 of CPA 4. Sealing element 30 in this exemplary embodiment is designed as a stopper 31, which is designed merely by way of example with multiple notches. Stopper 31 is preferably oversized with respect to further opening 42, so that when it is introduced, inserted or pressed into further opening 42, it seals further opening 42. Stopper 31 may, for example, include an elastic material (for example, rubber or a plastic or cork), so that the sealing function is maintained, for example, even during temperature fluctuations.

In the exemplary embodiment of FIGS. 1A through 1C, sealing element 30 is situated at a first front end 10 of CPA 4. First front end 10 points here in the direction that is defined by the movement of CPA 4 from first position P1 into second position P2. In the exemplary embodiment represented, CPA 4 may be moved from first position P1 into second position P2 by a shift from the top downward, i.e., along insertion direction E.

FIG. 1B shows plug connector arrangement 100 from FIG. 1A after establishing the plug connection in the defined plug position, in which CPA 4 is still located in first position P1. Thus, the operator or installer has already established the plug connection in the correct plug position. CPA 4, however, has not yet been shifted, so that further opening 42 at connecting piece 40 is still open and an exchange of media or a fluid communication from interior 3 to exterior 6 is still possible.

FIG. 1C shows plug connector arrangement 100 from FIG. 1B, in which CPA 4 is moved into second position P2 (along the direction of the arrow represented in CPA 4). Sealing element 30 in the form of stopper 31 is now introduced into further opening 42 and thus seals interior 3 from exterior 6.

In principle, it is also possible that a diaphragm (see FIGS. 2A through 2C) is situated or attached at opening 7 and/or at further opening 42 or in connecting piece 40, which is gas-permeable but impermeable to liquids. Thus, a penetration of dirt, filth and liquids may also be prevented.

Figure 2A:
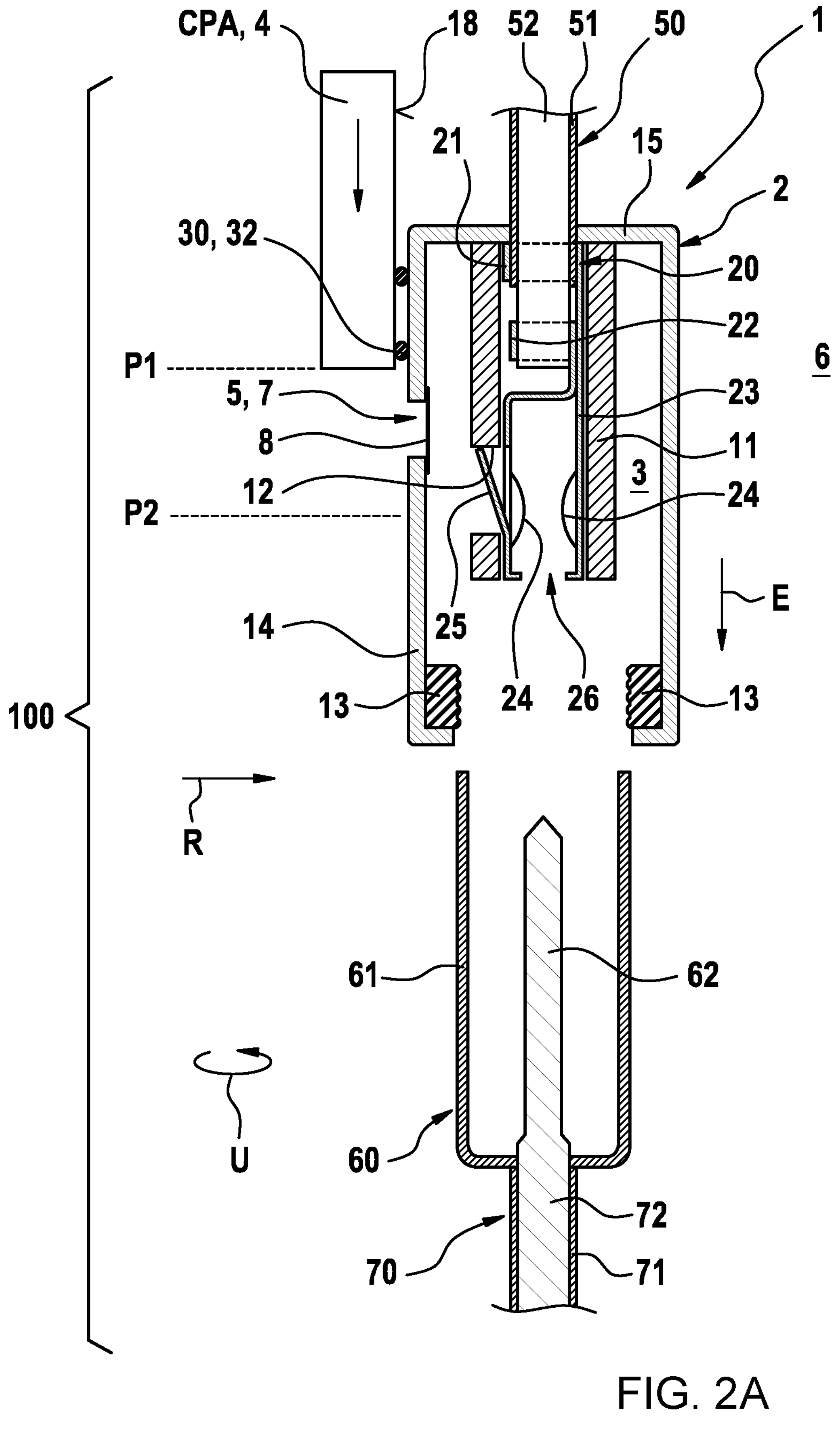
FIG. 2A schematically shows a cross section of a further plug connector and of a further mating plug connector (further plug connector arrangement) in a non-connected plug position with a CPA in a first position, in accordance with an example embodiment of the present invention.
Figure 2C:
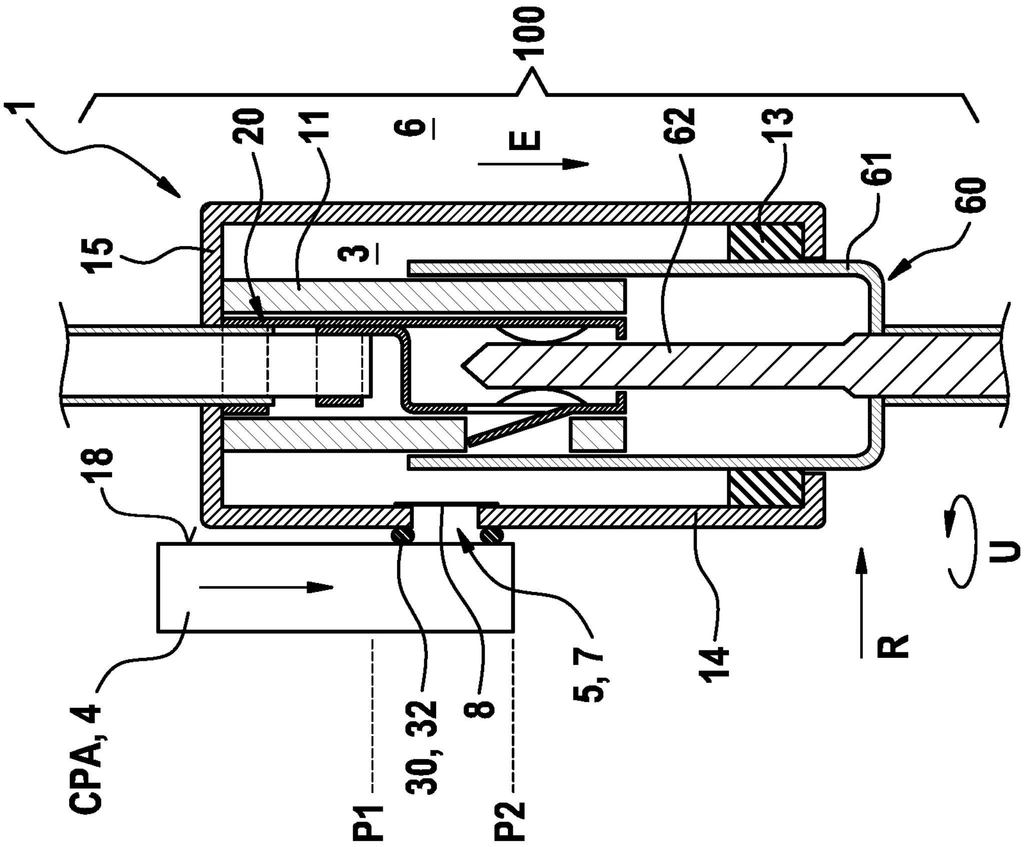
FIG. 2C shows the plug connection from FIG. 2B, in which the CPA is moved into a second position, in accordance with an example embodiment of the present invention.
Figure 2B:
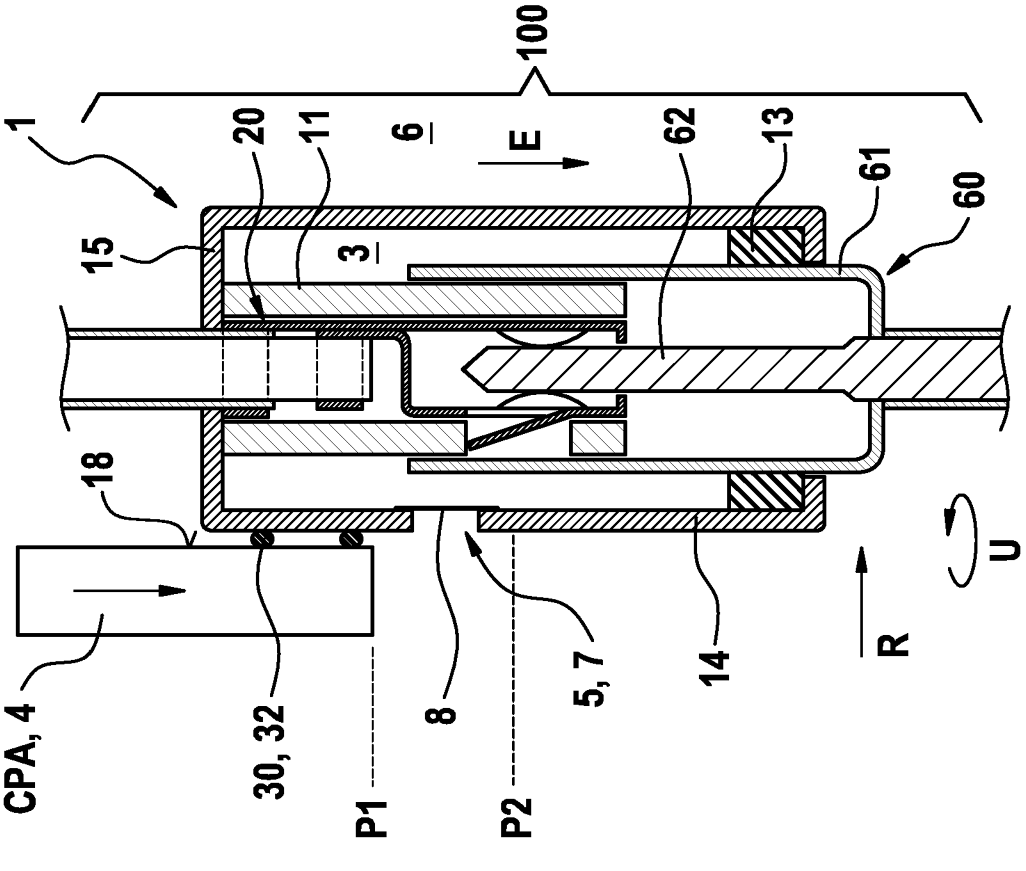
FIG. 2B shows the plug connector arrangement from FIG. 2A after establishing the plug connection in the defined plug position, in which the CPA is still located in the first position, in accordance with an example embodiment of the present invention.

FIGS. 2A through 2C show a further plug connector arrangement 100.

FIG. 2A schematically shows a cross section of a further plug connector 1 and of a further mating plug connector 60 in a non-connected plug position with a CPA 4 in a first position P1.

Plug connector 1 from FIG. 2A differs from the plug connector from FIG. 1A, among other things, in that in the plug connector from FIG. 2A, a diaphragm 8 is situated at the side of opening 7 facing interior 3. This diaphragm 8 is, for example, gas-permeable, but impermeable to liquids. Thus, when connecting plug connector 1 and mating plug connector 60, air is able to escape from interior 3, the penetration of (liquid) water and of dirt and filth, however, is prevented or is at least drastically reduced.

Furthermore, in plug connector 1 represented here, no connecting piece 40 is situated at pressure equalization element 5 designed as opening 7.

Sealing element 30 is situated at a surface 18 of CPA 4, surface 18 facing housing 2. Sealing element 30 is designed here, for example, as O-ring 32. It may, however, also be designed as a sleeve or in another form.

Opening 7 is free in first position P1 of CPA 4, so that a fluid-conducting connection exists between interior 3 and exterior 6.

FIG. 2B shows plug connector arrangement 100 from FIG. 2A after establishing the plug connection in the defined plug position. CPA 4, however, is still located in first position P1, so that opening 7 is still free.

FIG. 2C shows the plug connector from FIG. 2B, in which CPA 4 has been moved, for example, by an operator or an installer, into second position P2. Sealing element 30 or the sealing means designed as O-ring 32 abuts housing 2 and fully encloses the edge of opening 7. As a result, air is no longer able to escape from interior 3 or to penetrate into the latter, because interior 3 is sealed by radial seal 13 and by mating plug connector housing 61 at the side facing mating plug connector 60. On the side opposite opening 7, surface 18 or CPA 4 prevents a fluid communication or conduction of fluid between interior 3 and exterior 6.

Finally, it is noted that plug connector 1 or plug connector arrangement 100 is or may be intended for or suitable for or configured for the application or use in motor vehicles. However, plug connector 1 is not restricted to such applications or uses.

What is claimed is:

1. A plug connector for connecting to a mating plug connector along an insertion direction, the plug connector comprising:

a housing including an interior and a contact element situated in the interior;

a connector position assurance (CPA);

wherein the housing includes a pressure equalization element configured to equalize pressure of the interior with respect to an exterior of the housing, the CPA being situated at the housing and being movable between a first position and a second position relative to the housing;

wherein a sealing element is provided at the CPA; and wherein, in the second position, the pressure equalization element is sealed by the sealing element with respect to the exterior.

2. The plug connector as recited in claim 1, wherein the CPA is configured in such a way that it is movable into the second position only when the plug connector and the mating plug connector are connected in a defined plug position.

3. The plug connector as recited in claim 1, wherein the pressure equalization element is formed by an opening in the housing.

4. The plug connector as recited in claim 3, wherein the opening is covered by a diaphragm, the diaphragm being configured to be waterproof, but gas-permeable.

5. The plug connector as recited in claim 3, wherein:

the sealing element is a stopper, and the sealing element is introduced into the opening in the second position of the CPA, or the sealing element is pressed fully onto the opening in the second position of the CPA, or the sealing element is configured as a sleeve, the sealing element being pulled over the opening in the second position of the CPA, or the sealing element is configured as an O-ring, the sealing element abutting the housing and fully surrounding an edge of the opening in the second position of the CPA.

6. The plug connector as recited in claim 3, wherein a tubular connecting piece is provided at the opening, a further opening is provided at a communication end of the connecting piece facing away from the opening, and the CPA includes a first end, which faces the communication end of the connecting piece at least in the second position, the sealing element being situated at the first end of the CPA.

7. The plug connector as recited in claim 6, wherein the sealing element is situated at a first front end of the CPA, the first front end pointing in a direction defined by the movement of the CPA from the first position into the second position.

8. The plug connector as recited in claim 6, wherein:

the sealing element is a stopper, and the sealing element is introduced into the further opening of the connecting piece in the second position of the CPA, or the sealing element is pressed fully onto the further opening of the connecting piece in the second position of the CPA, or the sealing element is configured as a sleeve, and the sealing element is pulled over the communication end of the connecting piece in the second position of the CPA.

9. A plug connector arrangement, comprising:

a plug connector for connecting to a mating plug connector along an insertion direction, the plug connector including:

a housing including an interior and a contact element situated in the interior, a connector position assurance (CPA), wherein the housing includes a pressure equalization element configured to equalize pressure of the interior with respect to an exterior of the housing, the CPA being situated at the housing and being movable between a first position and a second position relative to the housing, wherein a sealing element is provided at the CPA, and wherein, in the second position, the pressure equalization element is sealed by the sealing element with respect to the exterior; and, the mating plug connector, the mating plug connector including a mating plug connector housing, a mating contact element configured to contact the contact element being provided in the mating plug connector housing.

10. The plug connector arrangement as recited in claim 9, wherein the interior of the housing of the plug connector is sealed with respect to the exterior of the housing of the plug connector in a state in which the plug connector and the mating plug connector are connected in the defined plug position and in which the CPA is moved into the second position.

* * * * *